United States Patent
An et al.

(10) Patent No.: US 12,418,359 B2
(45) Date of Patent: Sep. 16, 2025

(54) DEVICES, SYSTEMS, AND METHODS FOR PERFORMING LANE-SPECIFIC ERROR DETECTION IN HIGH-SPEED DATA LINKS

(71) Applicant: ATI Technologies ULC, Markham (CA)

(72) Inventors: Shaofeng An, Markham (CA); YanFeng Wang, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 18/398,825

(22) Filed: Dec. 28, 2023

(65) Prior Publication Data

US 2025/0219760 A1 Jul. 3, 2025

(51) Int. Cl.
*H04L 1/00* (2006.01)

(52) U.S. Cl.
CPC .................. *H04L 1/0045* (2013.01)

(58) Field of Classification Search
CPC .............. H04L 1/0045; H03M 13/00
USPC .................................... 714/776, 758
See application file for complete search history.

(56) References Cited

U.S. PATENT DOCUMENTS

| 8,914,683 | B2* | 12/2014 | Thayer | G06F 11/1443 714/43 |
| 9,887,804 | B2* | 2/2018 | Birrittella | H04L 1/0045 |
| 2006/0212775 | A1* | 9/2006 | Cypher | H03M 13/09 714/758 |
| 2010/0083066 | A1* | 4/2010 | Sivaramakrishnan | H04L 1/0006 710/110 |
| 2014/0129909 | A1* | 5/2014 | Rotker | G06F 11/1076 714/799 |
| 2015/0163014 | A1* | 6/2015 | Birrittella | H04L 1/1874 714/807 |
| 2017/0141794 | A1* | 5/2017 | Tyson | H03M 13/091 |
| 2019/0238270 | A1 | 8/2019 | Pan et al. | |
| 2021/0242965 | A1 | 8/2021 | Pan et al. | |

OTHER PUBLICATIONS

International Search Report and Written Opinion in PCT Application No. PCT/IB2024/055911 mailed Sep. 13, 2024, by: Authorized Officer: Ali Mian.

* cited by examiner

*Primary Examiner* — Albert Decady
*Assistant Examiner* — Grace V Braden
(74) *Attorney, Agent, or Firm* — Greenberg Traurig, LLP

(57) ABSTRACT

An exemplary method for performing lane-specific error detection in high-speed data links involves receiving, at a receiver, an ordered set of data from a transmitter communicatively coupled to the receiver via a data link. The exemplary method also involves identifying, in the ordered set of data, an error-detection reference. The exemplary method further involves performing, in connection with one data lane of the data link, an error-detection operation on the ordered set of data based at least in part on the error-detection reference. Various other devices, systems, and methods are also disclosed.

20 Claims, 5 Drawing Sheets

DEVICES, SYSTEMS, AND METHODS FOR PERFORMING LANE-SPECIFIC ERROR DETECTION IN HIGH-SPEED DATA LINKS

BACKGROUND

High-speed data links often carry traffic between a transmitter and a receiver within a network. In some examples, such high-speed data links can include and/or represent multiple lanes that each transfer a different set of data in connection with a data stream. Unfortunately, in certain scenarios, the receiver is unable to detect and/or identify per-lane errors indicative of each lane's performance relative to the data stream as a whole. The instant disclosure, therefore, identifies and addresses a need for additional and improved devices, systems, and methods that support functions such as per-lane error detection in high-speed data links.

BRIEF DESCRIPTION OF THE DRAWINGS

The accompanying drawings illustrate a number of exemplary implementations and are a part of the specification. Together with the following description, these drawings demonstrate and explain various principles of the instant disclosure.

Figure 1:
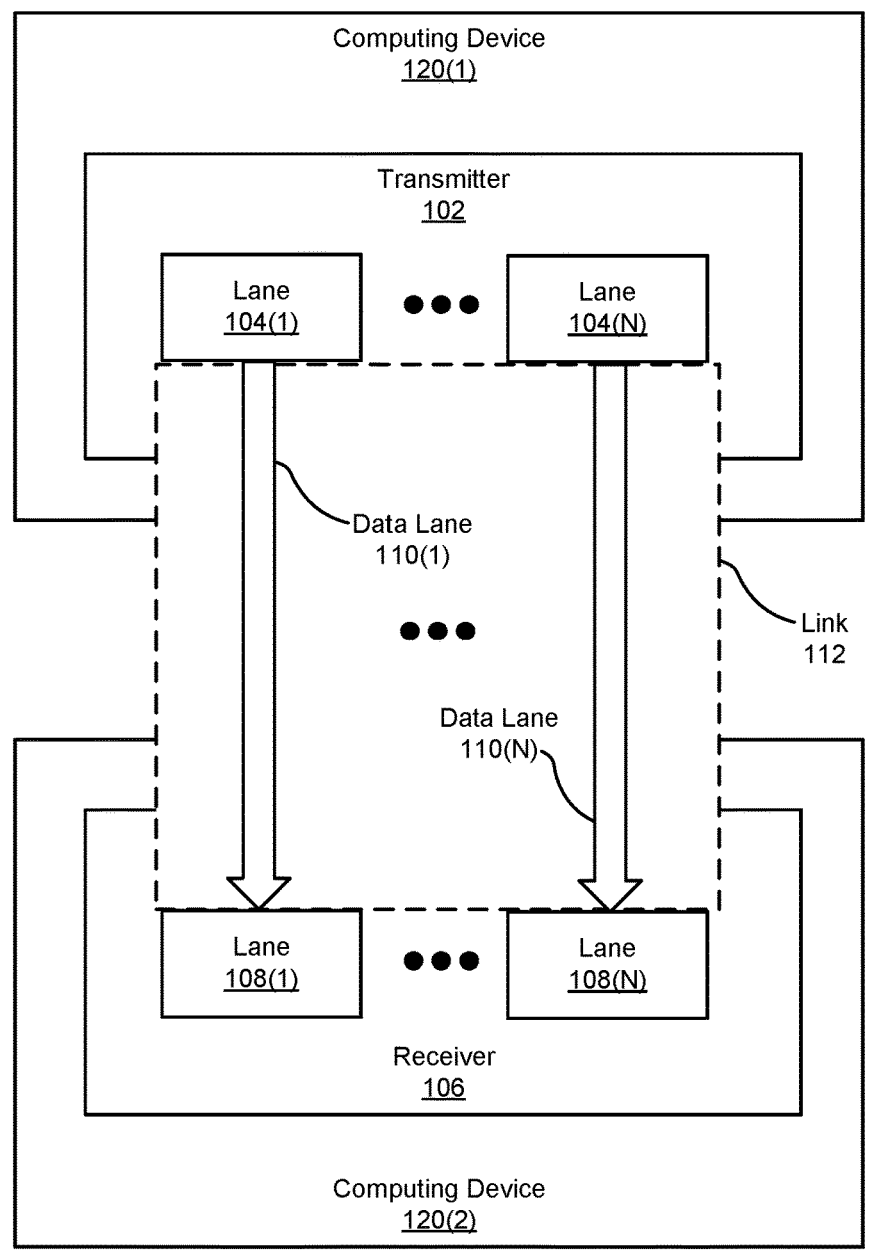
FIG. 1 is a block diagram of an exemplary system for performing lane-specific error detection in high-speed data links according to one or more implementations of this disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the instant disclosure covers all modifications, equivalents, and alternatives falling within the scope of the appended claims.

DETAILED DESCRIPTION OF EXEMPLARY IMPLEMENTATIONS

The present disclosure describes various devices, systems, and methods for performing lane-specific error detection in high-speed data links. In some examples, a transmitter and a receiver can be communicatively coupled to one another via a high-speed data link. In one example, the high-speed data link can include and/or represent multiple lanes that each simultaneously transfer a different set of data in connection with a data stream. Such data can include and/or represent communications transferred via the media access control (MAC) layer. Unfortunately, in some scenarios, the receiver is unable to detect and/or identify lane-specific errors indicative of each lane's performance without taking down, suspending, and/or deactivating the transfer of high-level data (e.g., MAC layer communications) via the data link. In other words, in such scenarios, the receiver needs to remove the data link from mission mode (e.g., suspend data transfer) to detect and/or identify such per-lane errors.

As will be described in greater detail below, the various devices, systems, and/or methods described in the present disclosure can eliminate, obviate, and/or overcome the need to take down, suspend, and/or deactivate the high-level data transfer to perform per-lane error detection. For example, a system can include and/or represent a pair of computing devices that are communicatively coupled to each other via a data link. In one example, one of the computing devices can include and/or represent a receiver that receives ordered sets of data (e.g., skip ordered sets) with error-detection references generated by the transmitter via the data link. In this example, the receiver can include and/or represent multiple lanes that are each equipped with their own circuitry (e.g., a logic gate tree) that performs an error-detection operation on one of the ordered sets of data.

As a specific example, each lane can include and/or represent circuitry that performs binary division and/or one or more logic operations on an ordered set of data to generate an output. In this example, the ordered set of data can include and/or contain an error-detection reference (e.g., an output from a cyclic redundancy check or binary parity check) generated by the transmitter. The circuitry can then compare the output with the error-detection reference to determine if an error occurred in that specific lane during transmission.

Continuing with this example, the receiver, the corresponding computing device, and/or the underlying system can collect lane-specific statistics representative of the performance of the individual lanes. The receiver, the corresponding computing device, and/or the underlying system can use the lane-specific statistics to inform, determine, and/or formulate certain actions to be performed. For example, the receiver, the corresponding computing device, and/or the underlying system can perform system validation and/or debug operations based at least in part on some of the lane-specific statistics. Additionally or alternatively, the receiver and/or the corresponding computing device can perform one or more repair operations on the data lanes based at least in part on some of the lane-specific statistics.

The following will provide, with reference to FIGS. 1-4, detailed descriptions of exemplary devices, systems, and/or corresponding implementations for performing lane-specific error detection in high-speed data links. Detailed descriptions of an exemplary method for performing lane-specific error detection in high-speed data links will be provided in connection with FIG. 5.

FIG. 1 illustrates an exemplary system 100 that facilitates and/or supports performing lane-specific error detection in high-speed data links. As illustrated in FIG. 1, exemplary system 100 can include and/or represent computing devices 120(1) and 120(2) that are communicatively coupled to one another via a link 112. In some examples, computing device 120(1) can include and/or represent a transmitter 102 with lanes 104(1)-(N). Additionally or alternatively, computing device 120(2) can include and/or represent a receiver 106 with lanes 108(1)-(N). In certain implementations, link 112 can include and/or represent data lanes 110(1)-(N) that connect, couple, and/or join lanes 104(1)-(N) of transmitter 102 to lanes 108(1)-(N) of receiver 106, respectively.

In some examples, transmitter 102 and/or receiver 106 can facilitate, support, and/or provide data transfer via link 112 for and/or on behalf of computing devices 120(1) and 120(2), respectively. In one example, link 112 can facilitate, support, and/or provide a direct connection without any intermediary nodes between computing devices 120(1) and 120(2). In another example, link 112 can facilitate, support, and/or provide an indirect connection with one or more intermediary nodes between computing devices 120(1) and 120(2). For example, link 112 can facilitate, support, and/or provide a connection through a local area network (such as an Ethernet network), a personal area network, a wide area network, a private network (e.g., a virtual private network), a telephone or cable network, a cellular telephone connection, a satellite data connection, one or more wireless or wired connections, the Internet, combinations or variations of one or more of the same, and/or any other suitable communication mechanism and/or channel.

Examples of transmitter 102 and receiver 106 include, without limitation, link adapters, wired network interfaces, network interface cards, wireless network interfaces, wireless network interface cards, serializer/deserializer (SerDes) interfaces, universal chiplet interconnect express (UCIe) interfaces, peripheral component interconnect express (PCIe) interfaces, portions of transceivers, host adapters (such as small computer system interface (SCSI) host adapters, universal serial bus (USB) host adapters, IEEE 1394 host adapters, and/or external SATA (eSATA) host adapters), advanced technology attachment (ATA), parallel ATA (PATA), serial ATA (SATA), fibre channel interface adapters, Ethernet adapters, combinations or variations of one or more of the same, portions of one or more of the same, and/or any other suitable communication interfaces. Although illustrated as single units in computing devices 120(1) and 120(2) of FIG. 1, transmitter 102 and/or receiver 106 can each include and/or represent a collection of multiple communication interfaces implemented on computing devices 120(1) and 120(2), respectively.

In some examples, link 112 can carry, exchange, and/or provide traffic (e.g., serial data) via the data link layer of the Open Systems Interconnection (OSI) model. In one example, the data link layer can include and/or represent certain sub-layers, such as the logic link control (LLC) layer and the MAC layer. In this example, link 112 can carry, exchange, and/or provide traffic via the MAC layer within the data link layer.

In some examples, link 112 can include and/or represent any suitable number of lanes that carry the traffic between transmitter 102 and receiver 106. In one example, each lane included in link 112 can provide, support, and/or facilitate data transfer of any suitable number of bits (e.g., 4, 8, 16, or 32 bits of serialized data) between transmitter 102 and receiver 106.

In some examples, transmitter 102 can prepare ordered sets of data in lanes 104(1)-(N) for transmission over data lanes 110(1)-(N) of link 112. In one example, transmitter 102 can prepare an ordered set of data in lane 104(1) for transmission over data lane 110(1) of link 112 and can prepare another ordered set of data in lane 104(N) for transmission over data lane 110(N) of link 112. For example, lanes 104(1)-(N) of transmitter 102 can each include and/or represent circuitry that performs an error-detection operation on one of the ordered sets of data. In one example, the error-detection operation can include and/or represent a cyclic redundancy check (CRC) and/or a binary parity (BIP) check. In this example, the circuitry incorporated in lanes 104(1)-(N) can reset the calculations and/or error-detection operations for every new ordered set of data. In some embodiments, resetting the calculations and/or error-detection operations can allow the circuits to process additional set of calculations and/or error detection operations on additional ordered sets of data.

In some examples, if the error-detection operations are CRCs, then the circuitry can perform the calculations on unscrambled representations of the ordered sets of data. Additionally or alternatively, if the error-detection operations are BIPs, then the circuitry can perform the calculations on scrambled representations of the ordered sets of data.

In some examples, the circuitry incorporated in lanes 104(1)-(N) can calculate error-detection references on ordered sets of data that are destined for transmission to lanes 108(1)-(N) of receiver 106 via link 112. In such examples, the circuitry incorporated in lanes 104(1)-(N) can embed the error-detection references into the ordered sets of data prior to transmission. For example, the circuitry incorporated in lane 104(1) can output an error-detection reference based at least in part on an error-detection operation performed on an ordered set of data. In this example, the circuitry incorporated in lane 104(1) can then insert and/or append the error-detection reference to the ordered set of data prior to transmission. In some examples, the error-detection references can be a set of data, signals, etc.

In certain implementations, each error-detection reference can include and/or represent a CRC reference and/or a BIP reference that corresponds to a specific one of lanes 104(1)-(N). As will be described in greater detail below, lanes 108(1)-(N) of receiver 106 can use the error-detection references inserted and/or appended to the ordered sets of data to determine whether any errors occurred during transmission.

In some examples, transmitter 102 can transmit the ordered sets of data from lanes 104(1)-(N) over data lanes 110(1)-(N) of link 112. In such examples, receiver 106 can receive the ordered sets of data via lanes 108(1)-(N) from data lanes 110(1)-(N) of link 112. For example, lane 108(1) of receiver 106 can receive and/or obtain an ordered set of data from transmitter 102 via data lane 110(1) of link 112. In this example, receiver 106 or computing device 120(2) can identify, in the ordered set of data, an error-detection reference that was inserted and/or appended by lane 104(1) of transmitter 102.

In some examples, like lanes 104(1)-(N) of transmitter 102, lanes 108(1)-(N) of receiver 106 can each include and/or represent a circuit that performs an error-detection operation on one of the ordered sets of data. In one example, the error-detection operation can include and/or represent a CRC and/or a BIP check that corresponds with the one performed on transmitter 102. In this example, the circuit incorporated in lane 108(1) can generate an output from the error-detection operation and then compare this output with the error-detection reference inserted and/or appended to the ordered set of data received and/or obtained via data lane 110(1). The circuit, receiver 106, and/or computing device 120(2) can then determine whether an error occurred in that ordered set of data during transmission across lane 104(1), data lane 110(1), and/or lane 108(1) based at least in part on this comparison.

In some examples, if the comparison results in a match between the output and the error-detection reference, then no error occurred or was detected during transmission. However, if the comparison results in a mismatch between the output and the error-detection reference, then at least one error (e.g., a burst error, random bit flips, etc.) might have occurred during transmission. In one example, the circuit can generate a statistic (e.g., an error statistic) indicating whether or not an error occurred during transmission based at least in part on this comparison.

In some examples, the circuit, receiver 106, and/or computing device 120(2) can generate a statistic based at least in part on this comparison of the output and the error-detection reference. In such examples, the statistic can represent and/or indicate the performance of lane 104(1), data lane 110(1), and/or lane 108(1). In one example, circuits incorporated in the other lanes of receiver 106 can perform similar and/or identical error-detection operations on other ordered sets of data received via other data lanes. In this example, the circuits incorporated in lanes 108(1)-(N) can reset the calculations and/or error-detection operations for every new ordered set of data. In some embodiments, resetting the calculations and/or error-detection operations can allow the circuits to process additional set of calculations and/or error detection operations on additional ordered sets of data.

In some examples, the circuits incorporated in lanes 108(1)-(N) can receive additional ordered sets of data via data lanes 110(1)-(N) of link 112. In such examples, the circuits incorporated in lanes 108(1)-(N) can perform additional similar and/or identical error-detection operations on the additional ordered sets of data received via data lanes 110(1)-(N) of link 112. In one example, the circuits, receiver 106, and/or computing device 120(2) can generate additional statistics based at least in part on additional error-detection references embedded in the additional ordered sets of data.

In some examples, receiver 106, computing device 120(2), and/or system 100 can process (e.g., add, subtract, etc.) and/or record the statistics to a database dedicated to collecting and/or storing lane-specific statistics representative of the performance of lanes 104(1)-(N), data lanes 110(1)-(N), and/or lanes 108(1)-(N) over a certain period of time. In one example, such statistics can be unique and/or specific to one or more individual lanes, as opposed to only being applicable to link 112 as a whole. In this example, receiver 106, computing device 120(2), and/or system 100 can use the lane-specific statistics to inform, determine, and/or formulate certain actions to be performed. Examples of such actions include, without limitation, system validations, debug operations, lane repairs and/or adjustments, combinations or variations of one or more of the same, portions of one or more of the same, and/or any other suitable actions.

Figure 2:
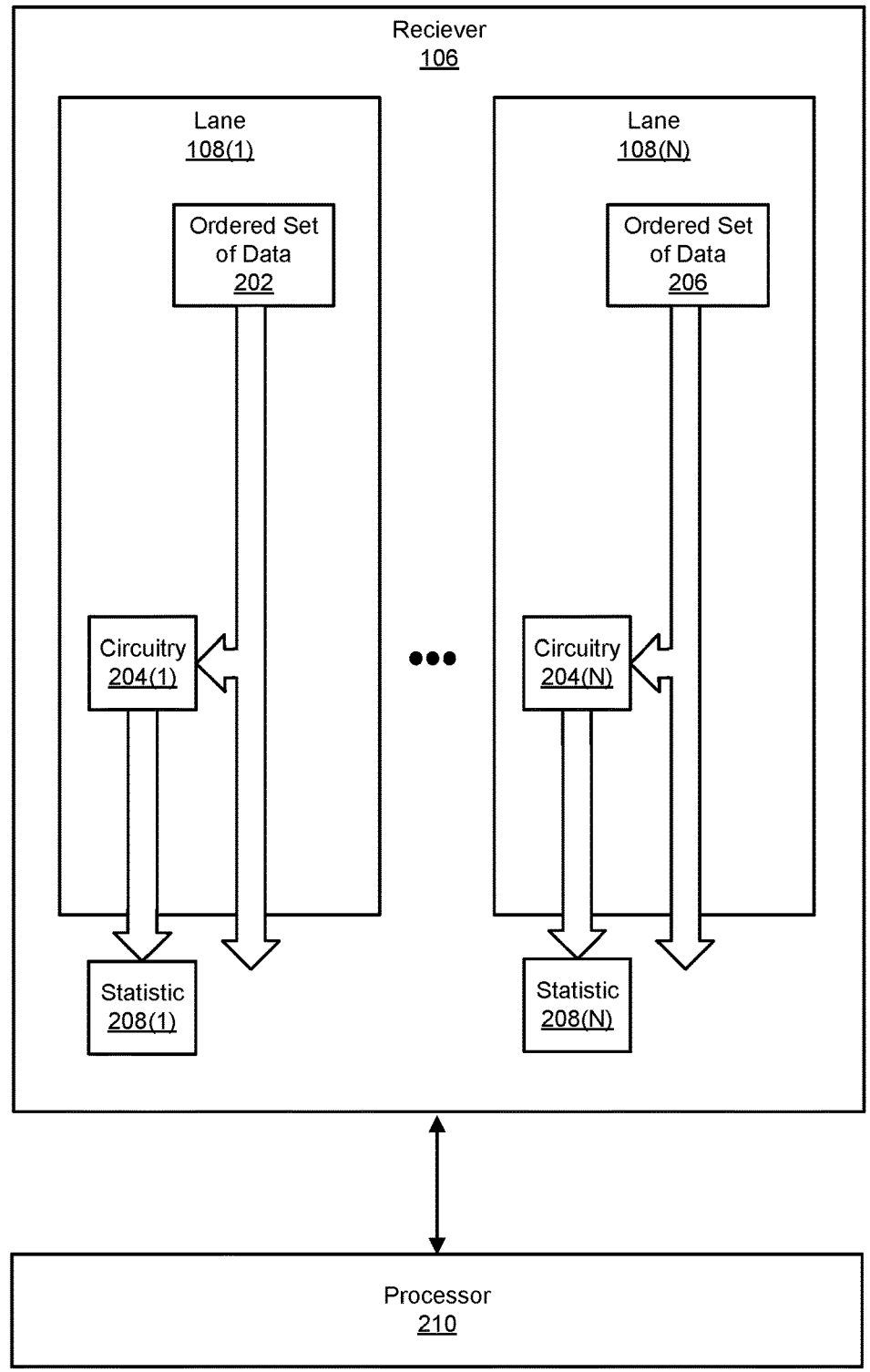
FIG. 2 is a block diagram of an exemplary computing device equipped with a receiver that supports per-lane error detection in high-speed data links according to one or more implementations of this disclosure.

FIG. 2 illustrates an exemplary implementation of computing device 120(2) for performing lane-specific error detection in high-speed data links. In some examples, computing device 120(2) can include and/or represent certain components and/or features that perform and/or provide functionalities that are similar and/or identical to those described above in connection with FIG. 1. As illustrated in FIG. 2, computing device 120(2) can include and/or represent a processor 210 communicatively coupled to receiver 106. In one example, receiver 106 can include and/or represent lanes 108(1)-(N) through which ordered sets of data pass and/or traverse upon receipt from transmitter 102.

In some examples, lanes 108(1)-(N) of receiver 106 can include and/or represent circuitries 204(1)-(N) that perform in-lane calculations and/or operations on the ordered sets of data to determine whether any errors occurred during transmission. For example, circuitries 204(1)-(N) can include and/or represent skip-check blocks incorporated in lanes 108(1)-(N). In this example, such skip-check blocks can detect whether the data transmissions were successful (e.g., completed without error) based on the error-detection operations (e.g., CRCs or BIPs). Additionally or alternatively, such skip-check blocks can trigger skipping or disregarding the erroneous data when unsuccessful data transmissions are detected.

In one example, lane 108(1) can receive and/or obtain an ordered set of data 202 from lane 104(1) via link 112. In this example, lane 108(N) can receive and/or obtain an ordered set of data 206 from lane 104(N) via link 112. In certain implementations, ordered sets of data 202 and 206 can each include and/or represent a skip-check ordered set (e.g., for skip-check CRC).

In some examples, lane 108(1) can include and/or represent circuitry 204(1) that performs an error-detection operation on ordered set of data 202. In such examples, lane 108(N) can include and/or represent circuitry 204(N) that performs an error-detection operation on ordered set of data 206. In one example, the error-detection operation can include and/or represent a binary division and/or logic operation. For example, circuitries 204(1) and 204(N) can use a divisor and/or polynomial (e.g., a CRC polynomial) to perform the error-detection operation on the receiver side. In this example, such a divisor and/or polynomial can also be used by the corresponding circuits incorporated in lanes 104(1)-(N) of transmitter 102 to perform the same error-detection operation on the transmitter side.

In certain implementations, the divisors and/or polynomials can differ from one lane to another. In other implementations, the divisors and/or polynomials can be the same across all the lanes. In one example, transmitter 102 and/or receiver 106 can agree upon and/or coordinate which divisors and/or polynomials are applied by the individual lanes for the error-detection operations.

In some examples, circuitry 204(1) can generate and/or output a statistic 208(1) indicative of whether an error occurred during transmission based at least in part on the error-detection operation performed on ordered set of data 202. Similarly, circuitry 204(N) can generate and/or output a statistic 208(N) indicative of whether an error occurred during transmission based at least in part on the error-detection operation performed on ordered set of data 206. In one example, processor 210 can process (e.g., add, subtract, etc.) and/or record the statistics to a database dedicated to collecting and/or storing lane-specific statistics representative of the performance of the respective data lanes over a certain period of time. In this example, processor 210 can perform certain actions (e.g., system validations, debug operations, and/or lane repairs and/or adjustments) based at least in part on the lane-specific statistics.

In some examples, processor 210 can include and/or represent a hardware-implemented device and/or circuitry capable of executing firmware, an operating system, and/or applications. For example, processor 210 can include and/or represent a central processing unit (CPU), a CPU core, a graphics processing unit (GPU), a data processing unit (DPU), and/or a GPU core. In one example, processor 210 can include and/or represent one or more of several processors (e.g., several x86 processors) implemented and/or disposed on a system on a chip (SoC). Additional examples of processor 210 include, without limitation, parallel accelerated processors, tensor cores, microprocessors, microcontrollers, field-programmable gate arrays (FPGAs), application-specific integrated circuits (ASICs), chiplets, portions of one or more of the same, variations or combinations of one or more of the same, and/or any other suitable processor. Although illustrated as a single unit in computing device 120(2) of FIG. 2, processor 210 can include and/or represent a collection of multiple processors implemented on computing device 120(2).

In some examples, processor 210 can implement and/or be configured with any of a variety of different architectures and/or microarchitectures. For example, processor 210 can implement and/or be configured as a reduced instruction set computer (RISC) architecture. In another example, processor 210 can implement and/or be configured as a complex instruction set computer (CISC) architecture. Additional examples of such architectures and/or microarchitectures include, without limitation, 16-bit computer architectures, 32-bit computer architectures, 64-bit computer architectures, x86 computer architectures, advanced RISC machine (ARM) architectures, microprocessor without interlocked pipelined stages (MIPS) architectures, scalable processor architectures (SPARCs), load-store architectures, portions of one or more of the same, combinations or variations of one or more of the same, and/or any other suitable architectures or microarchitectures.

Figure 3:
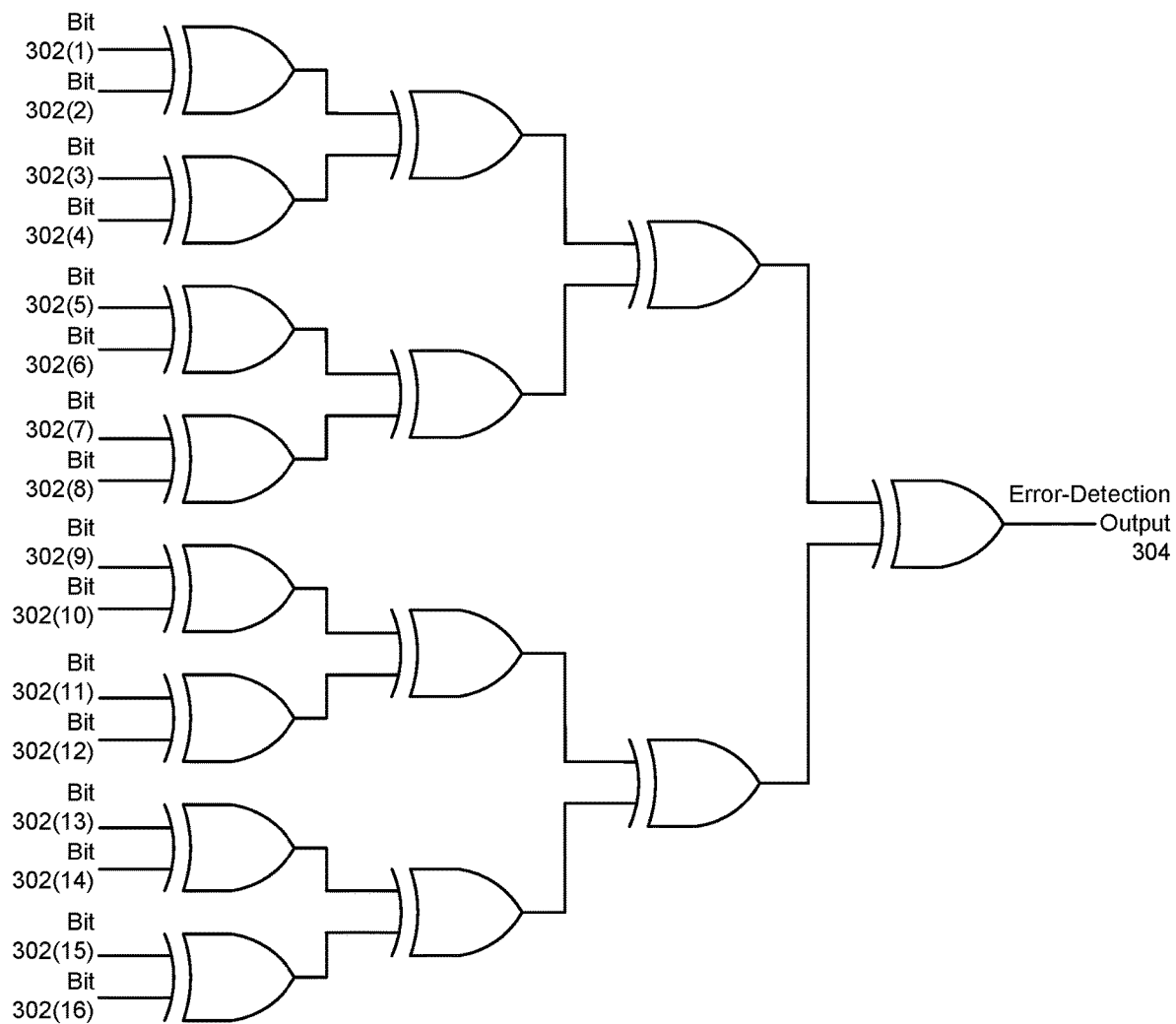
FIG. 3 is an illustration of an exemplary circuitry included in a receiver that supports per-lane error detection in high-speed data links according to one or more implementations of this disclosure.

In some examples, circuitries 204(1)-(N) can each include and/or represent a logic gate tree. For example, and as illustrated in FIG. 3, one implementation of circuitry 204(1) can include and/or represent a tree and/or network of exclusive OR (XOR) logic gates incorporated in lane 108(1) of receiver 106. In one example, the size of the XOR logic gate tree can correspond to and/or reflect the size of the divisor and/or polynomial. In this example, the XOR logic gate tree can include and/or represent a 16-bit input that corresponds to and/or is indicative of a 16-bit divisor and/or polynomial used for error detection and/or binary division. In certain implementations, the corresponding lanes of transmitter 102 can also include and/or represent circuits that are similar and/or identical to circuitries 204(1)-(N).

In some examples, the XOR logic gate tree illustrated in FIG. 3 can include and/or represent bits 302(1), 302(2), 302(3), 302(4), 302(5), 302(6), 302(7), 302(8), 302(9), 302(10), 302(11), 302(12), 302(13), 302(14), 302(15), and 302(16) as inputs. In one example, bits 302(1)-(16) can constitute and/or represent ordered set of data 202. In this example, the XOR logic gate tree can generate and/or represent an error-detection output 304 based at least in part on bits 302(1)-(16) as inputs. In certain implementations, error-detection output 304 can indicate whether an error occurred during transmission. Additionally or alternatively, error-detection output 304 can constitute and/or represent at least a portion of a remainder (e.g., a CRC remainder and/or a BIP remainder) from the error-detection operation.

Figure 4:
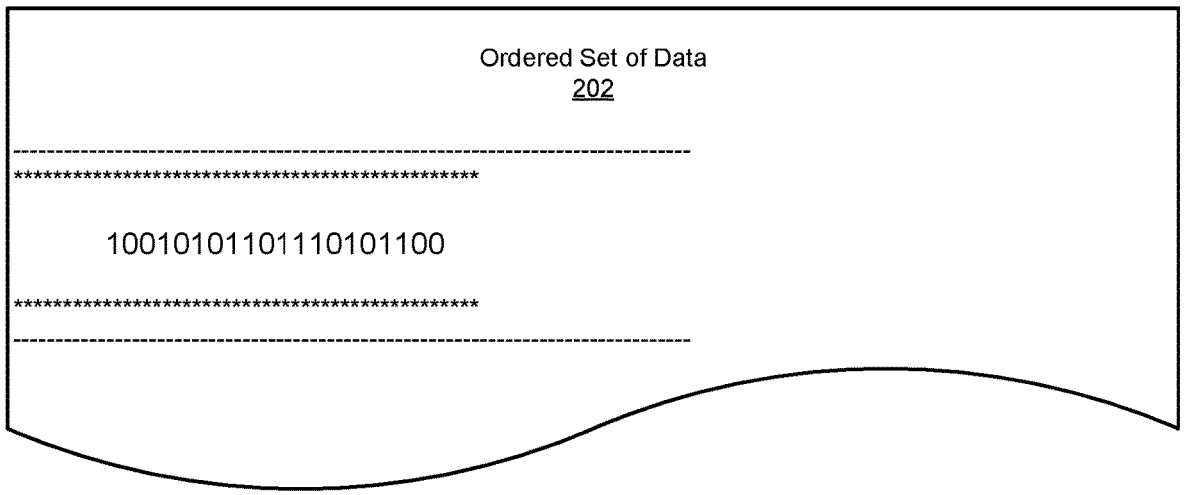
FIG. 4 is an illustration of ordered sets of data that are received by different lanes of a receiver that supports per-lane error detection according to one or more implementations of this disclosure.
Figure 4:
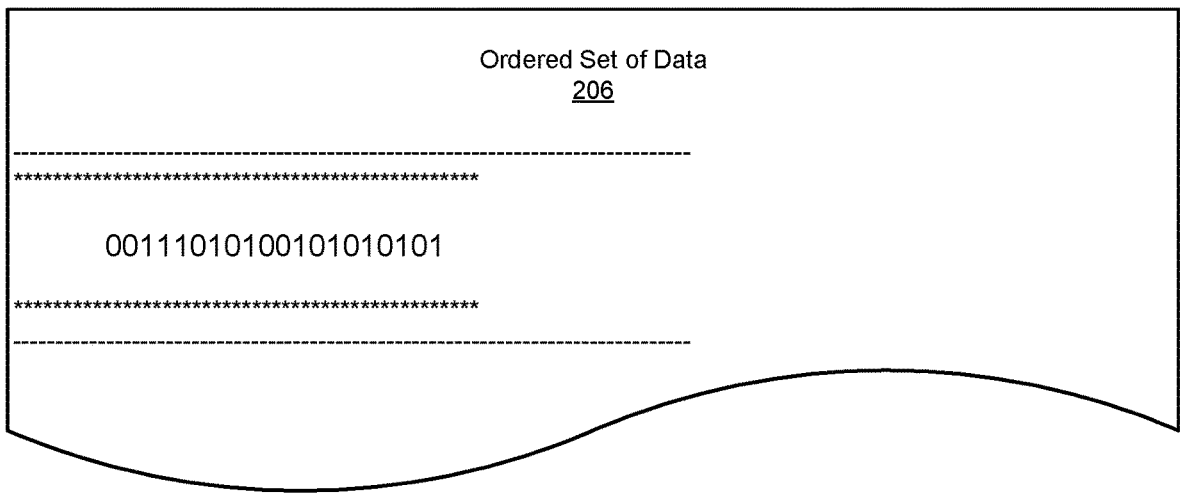

FIG. 4 illustrates exemplary implementations of ordered sets of data 202 and 206 transferred from transmitter 102 to receiver 106 via link 112. As illustrated in FIG. 4, exemplary ordered set of data 202 can include and/or represent a 16-bit payload with a 4-bit error-detection reference (e.g., a CRC remainder) generated by transmitter 102. For example, the 16-bit payload can include and/or represent "1001010110111010," and the 4-bit error-detection reference can include and/or represent "1100." Accordingly, if circuitry 204(1) generates an output of "1100" based on the "1001010110111010" input, then no error occurred and/or could be detected during transmission between transmitter 102 and receiver 106. However, if circuitry 204(1) generates any output other than "1100" based on the "1001010110111010" input, then at least an error occurred during transmission between transmitter 102 and receiver 106.

As similarly illustrated in FIG. 4, exemplary ordered set of data 206 can include and/or represent a 16-bit payload with a 4-bit error-detection reference (e.g., a CRC remainder) generated by transmitter 102. For example, the 16-bit payload can include and/or represent "00111101010010101," and the 4-bit error-detection reference can include and/or represent "0101." Accordingly, if circuitry 204(N) generates an output of "0101" based on the "00111101010010101" input, then no error occurred or could be detected during transmission between transmitter 102 and receiver 106. However, if circuitry 204(N) generates any output other than "0101" based on the "00111101010010101" input, then at least an error occurred during transmission between transmitter 102 and receiver 106.

In some examples, the various devices and/or systems described in connection with FIGS. 1-4 can include and/or represent one or more additional circuits, components, and/or features that are not necessarily illustrated and/or labeled in FIGS. 1-4. For example, system 100 can also include and/or represent additional computing devices, analog and/or digital circuitry, onboard logic, transmitters, receivers, transceivers, transistors, resistors, capacitors, diodes, inductors, switches, registers, flipflops, connections, traces, buses, semiconductor (e.g., silicon) devices and/or structures, processing devices, storage devices, circuit boards, packages, substrates, housings, combinations or variations of one or more of the same, and/or any other suitable components that facilitate and/or support performing lane-specific error detection in high-speed data links. In certain implementations, one or more of these additional circuits, components, devices, and/or features can be inserted and/or applied between any of the existing circuits, components, and/or devices illustrated in FIGS. 1-4 consistent with the aims and/or objectives provided herein. Accordingly, the electrical and/or communicative couplings described with reference to FIGS. 1-4 can be direct connections with no intermediate components, devices, and/or nodes or indirect connections with one or more intermediate components, devices, and/or nodes.

In some examples, the phrase "to couple" and/or the term "coupling", as used herein, can refer to a direct connection and/or an indirect connection. For example, a direct coupling between two components can constitute and/or represent a coupling in which those two components are directly connected to each other by a single node that provides electrical continuity from one of those two components to the other. In other words, the direct coupling can exclude and/or omit any additional components between those two components.

Additionally or alternatively, an indirect coupling between two components can constitute and/or represent a coupling in which those two components are indirectly connected to each other by multiple nodes that fail to provide electrical continuity from one of those two components to the other. In other words, the indirect coupling can include and/or incorporate at least one additional component between those two components.

Figure 5:
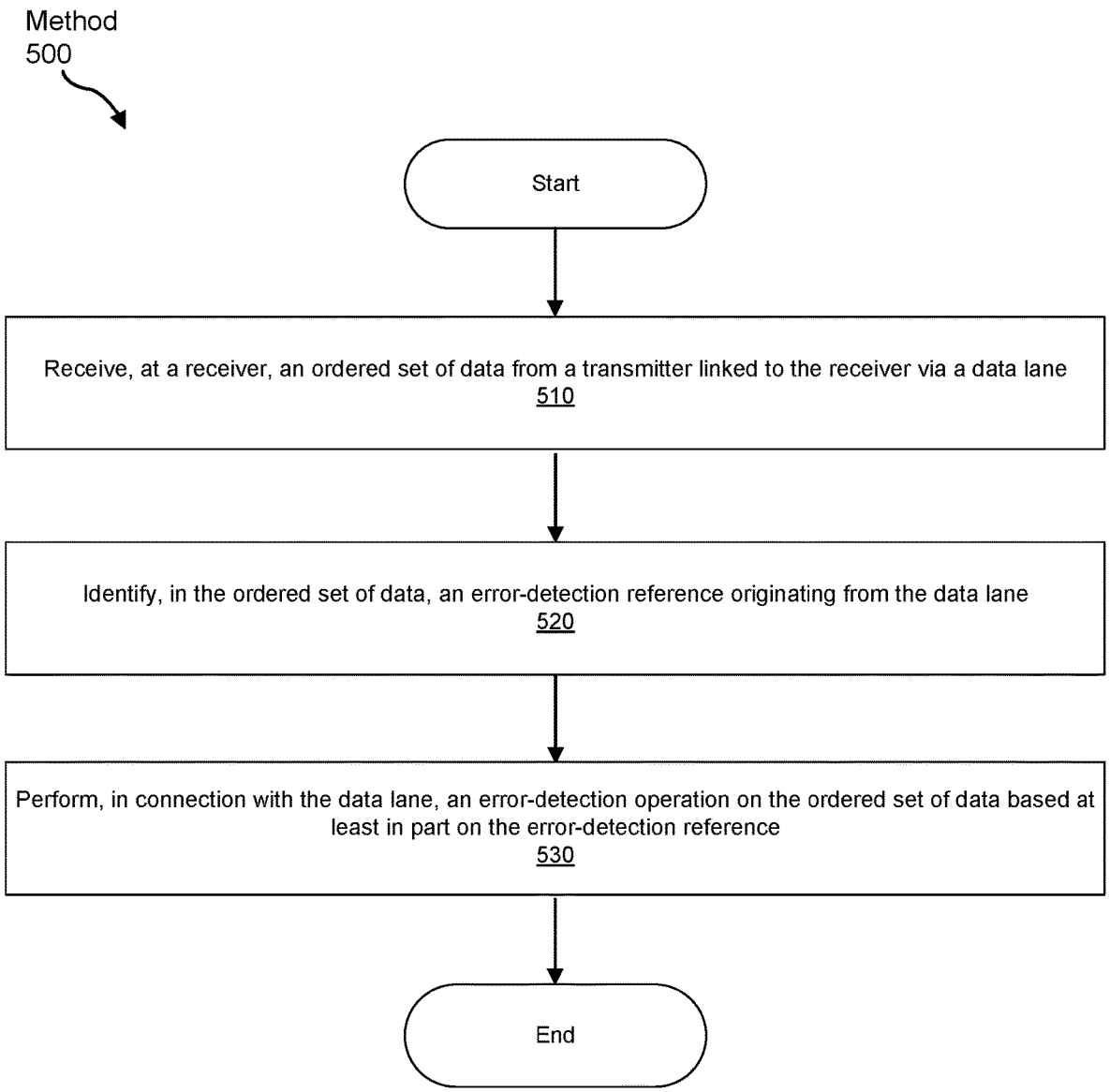
FIG. 5 is a flowchart of an exemplary method for performing lane-specific error detection in high-speed data links according to one or more implementations of this disclosure.

FIG. 5 is a flow diagram of an exemplary method 500 for performing lane-specific error detection in high-speed data links. In one example, the steps shown in FIG. 5 can be performed and/or executed during the operation of a receiver, computing device, and/or system. Additionally or alternatively, the steps shown in FIG. 5 can also incorporate and/or involve various sub-steps and/or variations consistent with the descriptions provided above in connection with FIGS. 1-4.

As illustrated in FIG. 5, exemplary method 500 includes and/or involves the step of receiving an ordered set of data from a transmitter linked to a receiver via a data lane (510). Step 510 can be performed in a variety of ways, including any of those described above in connection with FIGS. 1-4. For example, a receiver incorporated in a computing device can receive an ordered set of data from a transmitter linked to the receiver via a data lane.

Exemplary method 500 also includes and/or involves the step of identifying an error-detection reference originating from the data lane (520). Step 520 can be performed in a variety of ways, including any of those described above in connection with FIGS. 1-4. For example, the receiver and/or the computing device can identify, in the ordered set of data, an error-detection reference originating from the data lane.

Exemplary method 500 further includes the step of performing, in connection with the data lane, an error-detection operation on the ordered set of data based at least in part on the error-detection reference (530). Step 530 can be performed in a variety of ways, including any of those described above in connection with FIGS. 1-4. For example, the receiver and/or the computing device can perform, in connection with the data lane, an error-detection operation on the ordered set of data based at least in part on the error-detection reference.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality. Furthermore, the various steps, events, and/or features performed by such components should be considered exemplary in nature since many alternatives and/or variations can be implemented to achieve the same functionality within the scope of this disclosure.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the instant disclosure. The implementations disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
receiving, at a receiver via one data lane of a data link, an ordered set of data from a transmitter communicatively coupled with the receiver via the data link;
identifying, in the ordered set of data, an error-detection reference; and
detecting an error that occurred in the one data lane by:
performing an error-detection operation on the ordered set of data based at least in part on the error-detection reference; and
comparing an output of the error-detection operation with the error-detection reference.

2. The method of claim 1, wherein:
the data link comprises a plurality of data lanes that includes the one data lane; and
the one data lane comprises:
a lane of the receiver; and
a lane of the transmitter corresponding to the lane of the receiver.

3. The method of claim 2, further comprising:
calculating, at the lane of the transmitter, the error-detection reference based at least in part on the ordered set of data; and
embedding, at the corresponding lane of the transmitter, the error-detection reference into the ordered set of data.

4. The method of claim 3, wherein:
receiving the ordered set of data comprises receiving, at the lane of the receiver, the ordered set of data from the lane of the transmitter; and
performing the error-detection operation comprises performing, by circuitry, the error-detection operation on the ordered set of data based at least in part on the error-detection reference, wherein the circuitry is incorporated in the lane of the receiver.

5. The method of claim 1, further comprising:
generating, based at least in part on the error-detection operation, an error statistic indicative of a performance of the one data lane.

6. The method of claim 5, further comprising:
receiving, at the receiver, an additional ordered set of data from the transmitter;
identifying, in the additional ordered set of data, an additional error-detection reference originating from the one data lane; and
performing, in connection with the one data lane, an additional error-detection operation on the additional ordered set of data based at least in part on the additional error-detection reference.

7. The method of claim 6, further comprising:
generating, based at least in part on the additional error-detection operation, an additional error statistic indicative of the performance of the one data lane.

8. The method of claim 7, further comprising performing, in connection with the one data lane, an action based at least in part on the error statistic and the additional error statistic.

9. The method of claim 8, wherein the action comprises at least one of:

performing a system validation based at least in part on the error-detection operation;
performing a debug operation based at least in part on the error-detection operation; or
performing a repair operation on the one data lane based at least in part on the error-detection operation.

10. The method of claim 1, further comprising:
receiving, at the receiver, an additional ordered set of data from the transmitter via an additional data lane of the data link;
identifying, in the additional ordered set of data, an additional error-detection reference; and
performing, via an additional circuitry in connection with the additional data lane, an additional error-detection operation on the additional ordered set of data based at least in part on the additional error-detection reference.

11. The method of claim 10, further comprising:
generating, based at least in part on the additional error-detection operation, one or more additional error statistic indicative of a performance of the additional data lane.

12. The method of claim 11, further comprising performing, in connection with the additional data lane, an action based at least in part on the one or more additional error statistic.

13. The method of claim 1, wherein performing the error-detection operation comprises performing the error-detection operation on the ordered set of data via a plurality of exclusive OR (XOR) gates.

14. The method of claim 1, wherein the error-detection operation comprises at least one of:
a cyclic redundancy check (CRC); or
a binary parity (BIP) check.

15. A computing device comprising:
a receiver configured to:
receive, via one lane of a data link, an ordered set of data from a transmitter communicatively coupled to the receiver via the data link; and
identify, in the ordered set of data, an error-detection reference; and
circuitry configured to detect an error that occurred in the one data lane by:
performing an error-detection operation on the ordered set of data based at least in part on the error-detection reference; and
comparing an output of the error-detection operation with the error-detection reference.

16. The computing device of claim 15, wherein:
the data link comprises a plurality of data lanes that includes the one data lane; and
the one data lane comprises:
a lane of the receiver; and
a lane of the transmitter corresponding to the lane of the receiver.

17. The computing device of claim 16, wherein:
the receiver is further configured to receive, at the lane of the receiver, the ordered set of data from the lane of the transmitter; and
the circuitry comprises a plurality of logic gates configured to perform the error-detection operation on the ordered set of data based at least in part on the error-detection reference.

18. The computing device of claim 17, wherein the plurality of logic gates comprise a plurality of exclusive OR (XOR) gates incorporated in the lane of the receiver.

19. The computing device of claim 15, wherein the circuitry is further configured to generate, based at least in part on the error-detection operation, an error statistic indicative of a performance of the one data lane.

20. A system comprising:
a transmitter; and
a receiver configured to:
receive an ordered set of data from the transmitter via one lane of a data link;
identify, in the ordered set of data, an error-detection reference; and
detect an error that occurred in the one data lane by:
performing an error-detection operation on the ordered set of data based at least in part on the error-detection reference; and
comparing an output of the error-detection operation with the error-detection reference.

\* \* \* \* \*